April 25, 1972 W. S. NAYLOR Re. 27,346

TANK UNIT FOR RECEIVING AND TRANSPORTING SEWER SOLIDS

Original Filed Jan. 5, 1968

William S. Naylor
INVENTOR

BY Prevel, Wilson & Matthews
ATTORNEYS

United States Patent Office

Re. 27,346
Reissued Apr. 25, 1972

27,346

TANK UNIT FOR RECEIVING AND TRANSPORTING SEWER SOLIDS

William S. Naylor, Pasadena, Tex., assignor to Naylor Pipe Cleaning Company

Original No. 3,463,172, dated Aug. 26, 1969, Ser. No. 696,083, Jan. 5, 1968. Application for reissue July 27, 1970, Ser. No. 58,354
Int. Cl. B08b *13/00, 3/00, 9/00*
U.S. Cl. 134—169 R 10 Claims

Matter enclosed in heavy brackets [ ] appears in the original patent but forms no part of this reissue specification; matter printed in italics indicates the additions made by reissue.

ABSTRACT OF THE DISCLOSURE

A tank unit for receiving and transporting sewer solids removed by a sewer cleaner or obtained from any source, wherein means are provided for introducing sewer fluid into the tank unit to settle and collect the solids while discharging the liquid by gravity from the tank unit back to the sewer or other location, and wherein means are provided for removing the solids from the tank unit after transporting the tank unit and solids to a waste disposal area.

BACKGROUND OF THE INVENTION

The field of this invention is tank units for receiving and transporting sewer solids.

When sewer lines are cleaned using sewer cleaning equipment such as that disclosed in United States Pat. No. 3,080,265, the solids collected at each manhole or cleanout hole must be removed to complete the cleaning operation. Although it is feasible to deposit such solids at the surface in the vicinity of the manhole, it is usually preferable or necessary to transport such removed solids to an area remote from the manhole for dumping. Heretofore, several types of equipment have been employed to receive and transport such sewer solids to a sewage disposal plant or similar area. For example, the most common equipment heretofore used includes open dump trucks and trailers with tanks. So far as is known, none of such prior equipment has been satisfactory. Open dump trucks are unsatisfactory because the waste liquid and semisolids slosh around and splash out during transportation, especially since travel to the dump is usually over poorly surfaced roads. With the tank constructions which have been used heretofore, rapid separation of the liquid from the solids in the tank has not been effected; further, it has been extremely difficult to remove all or most of the solids from the tank when dumping same at a disposal area.

SUMMARY OF THE INVENTION

With the present invention, the tank unit is constructed so that sewer fluid with solids is pumped from a manhole or cleanout hole into the tank at one end where the solids are forced to settle out while the liquid flows from the tank by gravity at the other end of the tank. When the tank has been filled with solids to a predetermined level, the tank unit is transported or driven to a sewage disposal area remote from the manhole, where the solids are dumped through a rear cleanout door and are thoroughly removed by washing with a spray and jet washing assembly inside of the tank unit. Although the tank unit is preferably mounted on a trailer for pulling by a truck or other vehicle, it can be mounted directly on a truck or other vehicle if desired.

DESCRIPTION OF THE PREFERRED EMBODIMENTS

Figure 1:
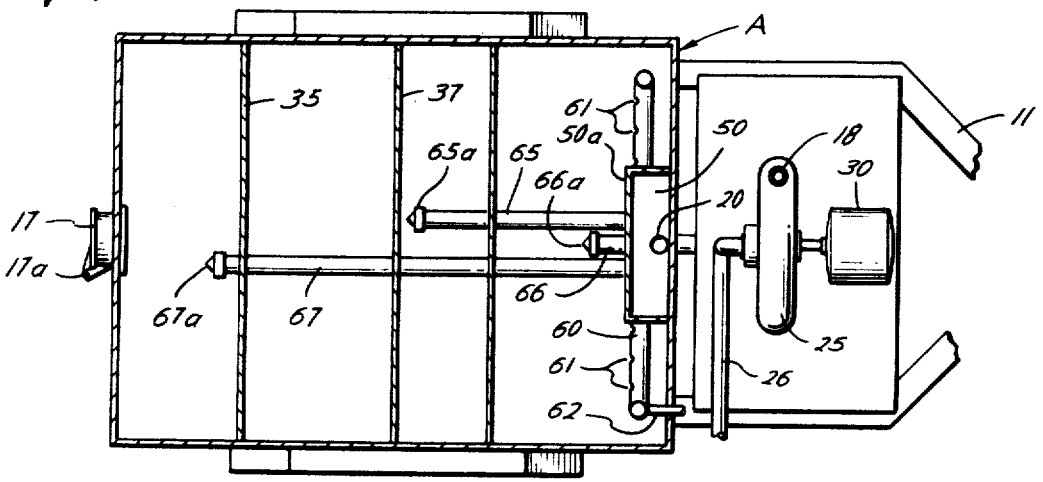
FIG. 1 is a horizontal cross-sectional view illustrating the preferred embodiment of the tank unit of the present invention.

In the drawings, the letter A designates generally the tank unit of the present invention which is adapted to receive, transport, and discharge solids from a sewer fluid. As will be explained in detail, the tank unit A is preferably constructed as a trailer adapted to be pulled by a truck or other vehicle. Such unit A is adapted to receive sewer liquid having solids therewith by pumping same from a manhole or similar location into the tank unit A, wherein the solids are separated and the liquid is discharged by gravity flow from the tank unit. Liquid is returned to the sewer, and after a sufficient quantity of solids has accumulated in the tank unit A, the unit A is pulled or otherwise moved to a location remote from the manhole, and the solids are then dumped or otherwise cleaned from the inside of the tank unit A so that such unit A can then be used again for another load.

Considering the invention more in detail, the tank unit A includes a metallic tank 10, preferably substantially cylindrical in shape as illustrated in the drawings, which is mounted on a support frame 11 of any suitable construction. Normally, such support frame 11 is formed by welding a plurality of steel I beams together to form a trailer frame which has wheels 12 mounted thereon with any suitable wheel supports 14. The front of the trailer frame 11 is provided with a trailer hitch (not shown) or other means for connecting to a truck or other vehicle for pulling same. The frame 11 may be a part of a truck bed having a cab and engine forwardly thereof in some instances so that the entire tank unit A is thereby movable as a part of the vehicle. However, in the normal usage, the support frame 11 is a trailer frame which, as explained, is adapted to be connected by a suitable trailer hitch to a truck or other vehicle for pulling same.

The tank 10 has a front or forward wall 10a, a rear or back wall 10b, a bottom 10c, and a top 10d. It is to be noted that although the tank 10 is illustrated as being substantially cylindrical, the bottom 10c thereof is sloping downwardly and rearwardly from the front wall 10a to the rear wall 10b.

The tnk 10 is closed except for a top hatch 15, a cleanout door 17, an inlet pipe 18, and a discharge pipe 20, the purpose of each of which will be explained hereinafter. The inlet pipe 18 has its rearward end extending through the rear wall 10b and its forward end connected to a sewage pump 25 of known construction. The suction pipe 26 connected to the pump 25 is connected to a hose or other line leading to the sewer liquid and solids in the manhole which is to be emptied or cleaned. The pump 25 is powered by a suitable engine 30 such as a gasoline engine for pumping sewer liquid and solids therewith into the tank 10 through the line 18. It is to be noted that the inlet pipe 18 has its point of entry through the wall 10b near the upper end of such wall 10b, and such fluids are directed against a baffle 35 which extends laterally and is welded at its outer ends to the inside of the tank 10 in proximity to the open end of the inlet pipe 18. The upper edge 35a of the baffle 35 is close to the top 10d of the tank 10 but is spaced therefrom so that air may pass on either side of such baffle 35 during the filling of the tank 10. The lower edge 35b of the baffle 35 is preferably disposed at a point above the center line of the tank 10 so that liquid with solids may pass forwardly of such baffle 35 while being deflected downwardly for depositing the solids and separating them from the liquid.

An intermediate baffle 37 which is also in the form of a plate extending transversely inside of the tank 10 is positioned at about the mid-point of the tank 10 between the front wall 10a and the rear wall 10b. The baffle 37, like the baffle 35, is preferably welded at its side edges to the inside of the tank 10 although either may be secured to the tank 10 in any suitable manner. The upper edge 37a of the baffle 37 is disposed above the lower edge 35b of the baffle 35, but it is well below the top 10d of the tank 10 so that liquid may readily pass over the upper edge 37a in its flow during the filling of the tank 10 with the solids.

An additional baffle 40, having an upper edge 40a and a lower edge 40b, is disposed at approximately the same elevation as the baffle 35 but forwardly thereof between the baffle 37 and the forward plate 10a. Such baffle 40a also extends laterally and is welded or is otherwise secured at its outer edges to the inside of the tank 10. Its upper edge 40a is close to the top surface 10d of the tank 10, but it is spaced therefrom so that air may pass from one side to the other to prevent any air lock or blocking due to air trapping during the filling of the tank 10 with the solids. The lower edge 40b of the baffle 40 is below the upper edge 37a of the baffle 37 so that the amount of solids passing forwardly of the plate 37 is controlled, while at the same time permitting liquids to flow forwardly of the baffle 40. The baffles 35, 37, and 40 contribute to the stabilization of the liquid or semisolids in the tank 10 during the transportation of the unit A from the manhole to the sewage disposal area. Such baffles 35, 37, and 40 prevent a sloshing of such liquid or semisolids, particularly when the unit A is transported across relatively rough roads. The air space above the baffles 35, 37, and 40 provides for an equalization of air in the area above the liquid in the tank 10 to avoid air locks during the filling operation.

Figure 2:
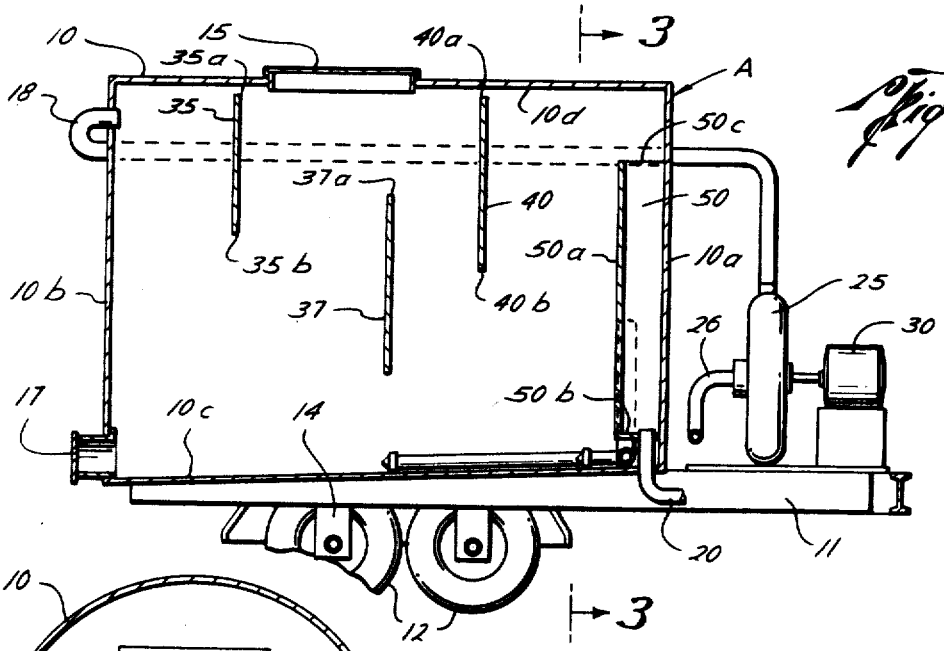
FIG. 2 is a vertical sectional view, partly in elevation, illustrating further details of the tank unit shown in FIG. 1.

At the forward end of the tank unit A, a liquid level control assembly 50 is provided which includes a substantially vertical enclosure 50a, which as illustrated is in a U-shape having its edges welded or otherwise secured to the front wall 10a (FIG. 1). The vertical enclosure 50a extends all of the way to the bottom 10c, or substantially to such bottom 10c, as illustrated in FIG. 2 so that the discharge pipe 20 extends through the bottom 50b of the control assembly 50 which is substantially at the bottom 10c. The upper edge 50c of the vertical enclosure 50a is near the top 10d of the tank 10, but it is preferably below the upper edges 34a and 40a of the baffles 35 and 40, respectively.

Since the vertical enclosure 50a extends for the major portion of the front wall 10a, a head of liquid is developed within the entire tank 10 which is at least as high as the edge 50c before any overflow of liquid occurs into the space defined by the vertical enclosure 50a and the front wall 10a. Thereafter, a constant head of liquid is maintained in the enclosure 50a of the control assembly 50 so that gravity flow of such liquid through the discharge pipe 20 is constant and is rapid enough to discharge the liquid as fast as it is pumped into the tank 10 by the pump 25. It is to be noted that the solids are deposited in the tank 10 before they reach the liquid level control assembly 50 so that the solids are kept from entering the enclosure 50a and thus they are prevented from plugging or clogging the discharge pipe 20.

The discharge pipe 20 is shown as extending underneath the frame 11, but preferably it is protected by the frame 11 and it is adapted to be joined to a hose by a suitable connector (not shown) for returning the liquid to the sewer by passing the hose down into the manhole, although the liquid may be discharged to any other suitable point since the solids have been removed.

The cleanout door 17 is hinged at any suitable hinge 17a so that it may be pivoted from its closed position shown in the drawings to an open position for the discharge of solids therefrom. It will be appreciated that any suitable clamping arrangement or spring loading may be provided to assure that the cleanout door 17 is closed except when dumping or discharging the solids from the tank 10. A hatch 15 on top of tank 10 may be hinged or otherwise suitably mounted so that it is normally in position to close the upper tank 10, but it may be moved or removed for inspecting the interior of the tank, or for supplemental washing down of the interior of the tank 10, as will be more evident hereinafter.

After a predetermined amount of solids has been deposited within the tank 10, which may accumulate up to a level approximately at the upper end 37a of the baffle 37, the filling procedure is stopped and the unit A is then ready for transportation to a point such as a sewage disposal plant for the discharge of the solids from the tank 10. The suction pipe 26 and the discharge pipe 20 are of course disconnected from their hoses prior to such transportation to the sewage disposal plant or other area for the dumping of the solids.

Figure 3:
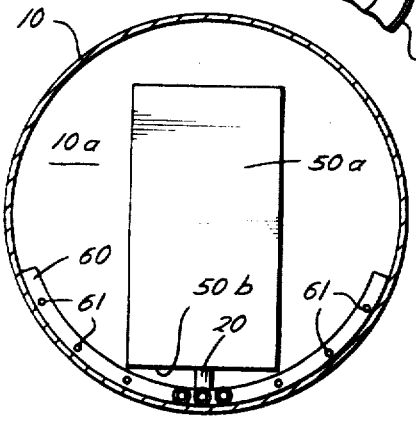
FIG. 3 is a view taken on line 3—3 of FIG. 2 and illustrating further details of the tank unit of this invention.

When the sewage disposal plant or other dumping area is reached the cleanout door 1 is opened and the solids are permitted to flow outwardly through such opening 17. Although the solids are generally in a semisolid state and have sufficient liquid therewith so that they can flow outwardly by gravity, the sloping bottom 10c assists in such flow. To adequately remove such solids, a washing assembly including a spray bar 60 is disposed along the lower portion of the front wall 10a, as best seen in FIG. 3. Such spray bar 60 has a plurality of openings or jet nozzles 61 at a plurality of points for spraying water at high velocity along the entire inside bottom surface of the tank 10 for cleaning solids from such surface. The water or other liquid which is introduced for cleaning purposes is admitted to the spray bar or tube 60 through an inlet pipe 62 which is connected by a hose or other suitable tube (not shown) to any source of water, such as a tank of water which is customarily on trucks used in the cleaning of the sewers and which is normally used for pulling the trailer unit A to the disposal area.

Additionally, jet nozzles are disposed in the bottom of the tank 10 at longitudinally spaced intervals, the preferred arrangement of which is indicated by the three pipes 65, 66, and 67 having jet nozzles 65a, 66a, and 67a. Water is preferably supplied to each pipe from the spray bar 60 and is discharged from such nozzles 65a, 66a, and 67a.

The spray assembly which includes the spray bar 60 and the spray nozzles 65a, 66a, and 67a is so arranged so that the solids are forced to move towards the cleanout door 17. Such waste is washed rearwardly until the last portion is ultimately cleaned out through the cleanout door 17 by the jet nozzle 67a. Although very little supplemental cleaning is normally desired or necessary, supplemental cleaning with a hand-operated hose may be accomplished by opening the hatch 15 and washing the inside of the tank 10 with a water stream from such hose (not shown). Thus, the inside of the tank 10 can be completely cleaned and all of the waste solids therein can be completey removed through the cleanout door 17 prior to the return of the unit A for another load or for storage purposes.

In the operation or use of the tank unit A of this invention, sewer fluids are pumped into the tank 10 at a manhole or other similar cleanout hole of the sewer line. The pump is preferably the pump 25 shown in the drawings which is mounted on the trailer frame 11 and which pumps the liquid and solids therewith to the entry point at the rear wall 10b where the inlet pipe 18 discharges such sewer liquid and solids to the inside of the tank 10.

The solids are deflected downwardly and ultimately collect on the bottom as they separate from the liquid which flows so as to fill the tank 10 up to the level of the upper edges 50c, at which time the liquid develops a head within the liquid control assembly 50 and thereafter flows by gravity through the discharge pipe 20. Such discharge pipe 20 returns the liquid with the solids essentially all removed to the sewer manhole or similar location. Such pumping of the sewer fluid is continued until a predetermined amount of the solids is collected within the tank 10, it being understood that the essentially clear liquid is continuously discharged by gravity through the discharge pipe 20 during the entire filling operation after the initial level of liquid at the edge 50c is reached. After the tank 10 is filled with solids or semisolids to the extent desired, it is then transported to a sewer disposal plant or other dumping location where the cleanout door 17 is opened to allow the solids to be discharged therefrom as previously explained. Also, the water is sprayed through the spray assembly including the spray bar 60 and the jet nozzle 65a, 66a, and 67a to wash the solids out through the open cleanout door 17, as previously explained. It thus can be seen that the waste solids can be readily deposited and separated from the liquid in the trailer unit A of this invention and transportation of such solids is accomplished without spilling same on the highway or countryside. Perhaps most important, the entire inside of the tank 10 can be readily cleaned and inspected so that the waste can be completely removed therefrom. This is particularly desirable to prevent odors from accumulating in the tank 10 and to prepare the tank A for storage for a length of time before the next use.

The foregoing disclosure and description of the invention are illustrative and explanatory thereof, and various changes in the size, shape, and materials as well as in the details of the illustrated construction may be made within the scope of the appended claims without departing from the spirit of the invention.

I claim:

1. A tank unit for receiving and transporting sewer solids, comprising:

(a) a support frame;

(b) a closed tank having a rear wall, a front wall, and a bottom mounted on said frame for support thereby and movement therewith;

(c) a pump for pumping sewer fluid with solids from a manhole or the like;

(d) an inlet pipe connected to the discharge side of said pump and [through] *extending into said tank near* the rear wall *and* near its upper end for introducing the fluid with solids into said tank;

(e) a liquid discharge pipe extending from inside of said tank [through its bottom] to the outside thereof near [the lower end of] said front wall; and (f) a liquid level control assembly including a vertical enclosure secured to said front wall, a closed bottom through which said liquid discharge pipe extends, and an open upper end near the top of said tank, whereby solids are collected in the tank outside of said liquid level control assembly while developing a constant liquid head for the gravity flow of liquid from the tank through said discharge pipe.

2. [The structure set forth in claim 1, including:] *A tank unit for receiving and transporting sewer solids, comprising:*

*(a) a support frame;*

*(b) a closed tank having a rear wall, a front wall, and a bottom mounted on said frame for support thereby and movement therewith;*

*(c) a pump for pumping sewer fluid with solids from a manhole or the like;*

*(d) an inlet pipe connected to the discharge side of said pump and extending into said tank near the rear wall and near its upper end for introducing the fluid with solids into said tank;*

*(e) a liquid discharge pipe extending from inside of said tank to the outside thereof near said front wall;*

[(a)] *(f)* a cleanout door in said rear wall near its lower end adapted to be closed [for] *when* filling said tank with solids and open for the discharge of solids from the tank; and

[(b)] *(g)* means for jetting cleaning fluid along the bottom [and sides] of said tank for washing collected solids out of the open cleanout door at a waste disposal area.

3. The structure set forth in claim 1, including:

(a) baffles extending transversely of said tank for deflecting solids to the bottom of said tank and to prevent sloshing of semisolids and liquid during transportation.

4. The structure set forth in claim 1, including:

(a) a cleanout door in said rear wall near its lower end adapted to be closed for filling said tank with solids and open for the discharge of solids from the tank;

(b) said bottom of said tank sloping downwardly from said front wall to said rear wall to facilitate discharge of solids through the open cleanout door; and (c) means for jetting cleaning fluid along the bottom and sides of said tank for washing collected solids out of the open cleanout door when at a waste disposal area.

5. The structure set forth in claim 1, including:

(a) an inlet baffle extending transversely of said tank in proximity to said inlet pipe at said rear wall;

(b) the upper edge of said baffle being near the top of said tank but spaced therefrom for the equilization of air in the area above the liquid in the tank; and (c) the lower edge of said baffle being above the center of said tank.

6. The structure set forth in claim 1, including:

(a) an inlet baffle extending transversely of said tank in proximity to said inlet pipe at said rear wall;

(b) the upper edge of said baffle being near the top of said tank but spaced therefrom for the equalization of air in the area above the liquid in the tank;

(c) the lower edge of said baffle being above the center of said tank;

(d) an intermediate baffle extending transversely of said tank at a point intermediate the rear wall and the front wall;

(e) the upper edge of said intermediate baffle extending above the lower edge of said inlet baffle; and (f) the lower edge of said intermediate baffle disposed blow the lower edge of said inlet baffle but spaced from the bottom of said tank.

7. The structure set forth in claim 1, including:

(a) an inlet baffle extending transversely of said tank in proximity to said inlet pipe at said rear wall;

(b) the upper edge of said baffle being near the top of said tank but spaced therefrom for the passage of air;

(c) the lower edge of said baffle being above the center of said tank;

(d) an intermediate baffle extending transversely of said tank at a point intermediate the rear wall and the front wall;

(e) the upper edge of said intermediate baffle extending above the lower edge of said inlet baffle;

(f) the lower edge of said intermediate baffle disposed below the lower edge of said inlet baffle but spaced from the bottom of said tank;

(g) a forward baffle extending transversely of said tank between said intermediate baffle and said vertical enclosure of said liquid level control assembly to assist said inlet baffle and said intermediate baffle in preventing excessive sloshing of the liquid and solids therewith in said tank during transportation of the unit;

(h) the upper edge of said forward baffle being near but spaced from the top of said tank; and (i) the bottom edge of said forward baffle being below the upper edge of said intermediate baffle but spaced from the bottom of said tank.

8. The structure set forth in claim 1, including:

(a) a cleanout door in said rear wall near its lower end which is normally closed during filling with waste but which is adapted to be opened for dumping the waste from the tank; and (b) a spray bar disposed along the lower portion of said front wall on the inside of said tank and having spray nozzles thereon for directing washing liquid along the sides and entire inside bottom surface of said tank to wash the solids towards said cleanout door.

9. The structure set forth in claim 1, including:

(a) a cleanout door in said rear wall near its lower end which is normally closed during filling with waste but which is adapted to be opened for dumping the waste from the tank;

(b) a spray bar disposed along the lower portion of said front wall on the inside of said tank and having spray nozzles thereon for directing washing liquid along the sides and entire inside bottom surface of said tank to wash the solids towards said cleanout door; and (c) a plurality of jet spray nozzles disposed on the bottom of the tank at different distances from the front wall for jetting solids outwardly through said cleanout door.

10. The structure set forth in claim 1, including:

(a) a cleanout door in said rear wall near its lower end;

(b) means for jetting cleaning fluid along the bottom and sides of said tank for washing collected solids out of the cleanout door when at a waste disposal area; and (c) a top hatch in the top of said tank which is normally closed but which is adapted to be opened for inspection of the inside of said tank and for supplemental cleaning thereof.

References Cited

The following references, cited by the Examiner, are of record in the patented file of this patent or the original patent.

UNITED STATES PATENTS

| | | | |
|---|---|---|---|
| 1,960,392 | 5/1934 | Ormsbee | 134—104 UX |
| 2,735,122 | 2/1956 | Pletcher | 210—521 X |
| 2,753,877 | 7/1956 | McKnight | 210—241 X |
| 3,260,368 | 7/1966 | Wagner et al. | 210—521 X |
| 3,348,687 | 10/1967 | Foster | 210—521 X |
| 3,415,381 | 12/1968 | Thayer | 210—220 X |
| 3,476,250 | 11/1969 | Fifer | 210—199 |
| 3,487,937 | 1/1970 | Koulovatos | 210—199 X |

FOREIGN PATENTS

| | | | |
|---|---|---|---|
| 182,065 | 6/1936 | Switzerland | 210—521 |

ROBERT L. BLEUTGE, Primary Examiner

U.S. Cl. X.R.

134—182; 210—241, 521